United States Patent
Ryu et al.

(10) Patent No.: US 9,451,537 B2
(45) Date of Patent: Sep. 20, 2016

(54) SCANNING METHOD AND SCANNING APPARATUS IN WIRELESS LAN

(71) Applicant: LG ELECTRONICS INC., Seoul (KR)

(72) Inventors: Kiseon Ryu, Anyang-si (KR); Giwon Park, Anyang-si (KR); Jinsam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 3 days.

(21) Appl. No.: 14/398,566

(22) PCT Filed: May 10, 2013

(86) PCT No.: PCT/KR2013/004164
§ 371 (c)(1),
(2) Date: Nov. 3, 2014

(87) PCT Pub. No.: WO2013/169072
PCT Pub. Date: Nov. 14, 2013

(65) Prior Publication Data
US 2015/0110091 A1    Apr. 23, 2015

Related U.S. Application Data

(60) Provisional application No. 61/645,063, filed on May 10, 2012.

(51) Int. Cl.
*H04W 48/16*     (2009.01)
*H04W 74/08*     (2009.01)
*H04W 84/12*     (2009.01)

(52) U.S. Cl.
CPC ............. *H04W 48/16* (2013.01); *H04W 74/08* (2013.01); *H04W 84/12* (2013.01)

(58) Field of Classification Search
None
See application file for complete search history.

(56) References Cited

U.S. PATENT DOCUMENTS

2013/0107825 A1* 5/2013 Cherian ............. H04W 76/021
  370/329
2013/0294270 A1* 11/2013 Yang ..................... H04W 48/16
  370/252

OTHER PUBLICATIONS

Barber, Phillip et al. "Broadcast Probe Response" (Year:2011, Dcn: 1500, Rev:0) IEEE 802.11 Document. Nov. 6, 2011 <URL=https://mentor.ieee.org/802.11/documents> See slides 4-9.

Siep, Tom et al. "Proposed Specification Framework for TGai" (Year.2012, Dcn: 151, Rev:7) IEEE 802.11 Document. Mar. 26, 2012 <URL=https://mentor.ieee.org/802.11/documents> See pp. 7-8, chapter 6.

Park, Gi Won et al. "Presentation documents for 12-0256 active scanning enhancement" (Year:2012, Dcn:257, Rev:1) IEEE 802.11 Documents. Mar. 12, 2012 <URL=https://mentor.ieee.org/802.11/documents> See slides 4-9.

* cited by examiner

*Primary Examiner* — Gary Mui
(74) *Attorney, Agent, or Firm* — Dentons US LLP

(57) ABSTRACT

Disclosed are a scanning method and scanning apparatus in a wireless LAN. The scanning method in a wireless LAN comprises: a step in which an access point (AP) receives a first probe request frame from a first station (STA); a step in which the AP unicasts a first probe response frame to the first STA as a response to the first probe request frame; a step in which the AP receives a second probe request frame from a second STA for a specific time interval after unicasting the first probe response frame to the first STA; and a step in which the AP broadcasts a second probe response frame as a response to the second probe request frame for a specific time interval. Thus, scanning processes can be quickly performed.

10 Claims, 14 Drawing Sheets

FIG. 1
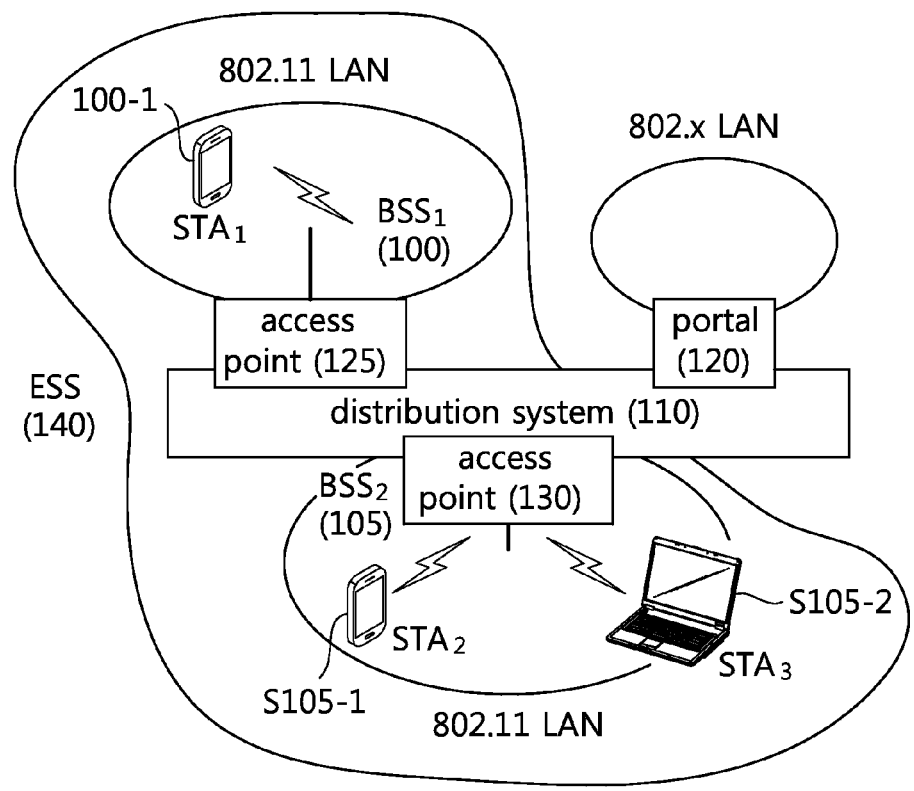
(A)
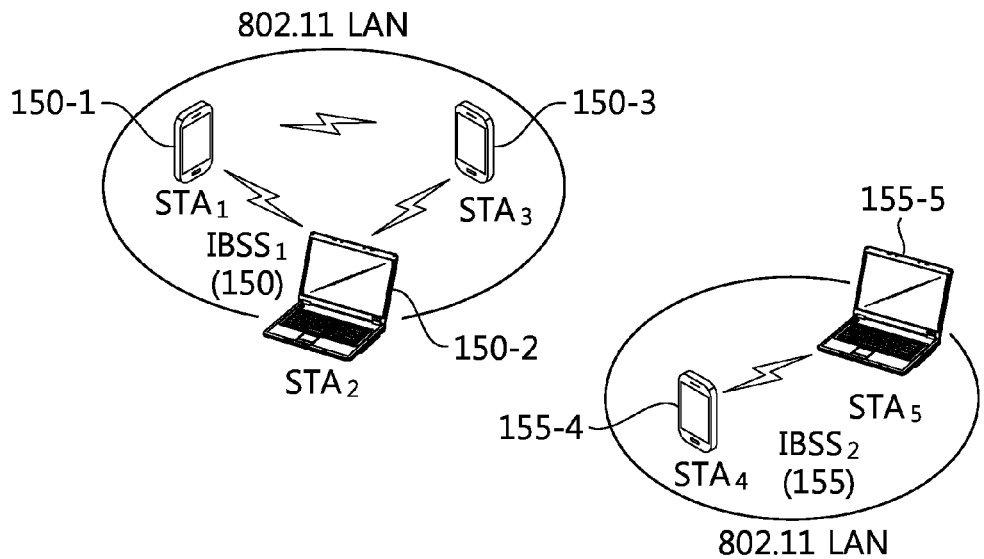
(B)

FIG. 6
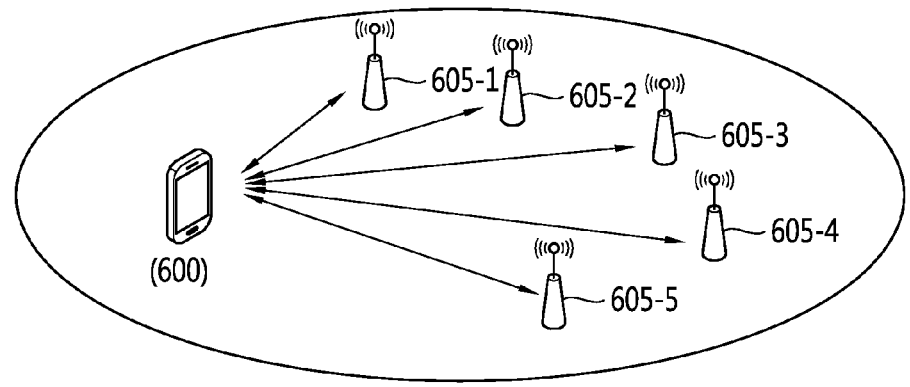
probe request frame (610)
(wildcard, SSID, wildcard BSSID)   (A)
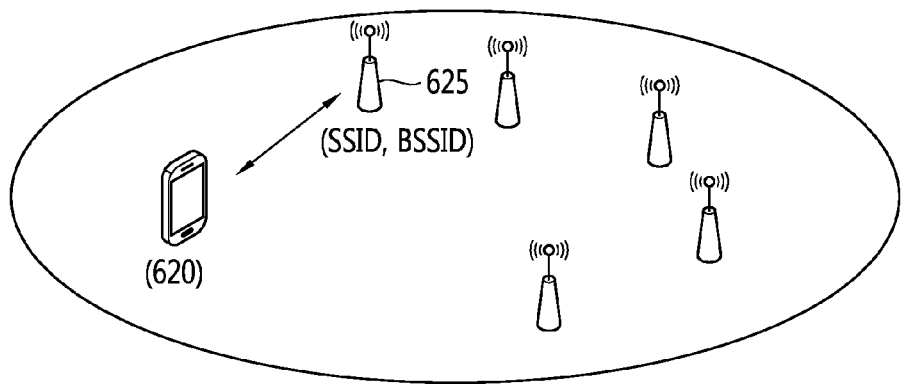
probe request frame (630)
(SSID, BSSID)   (B)
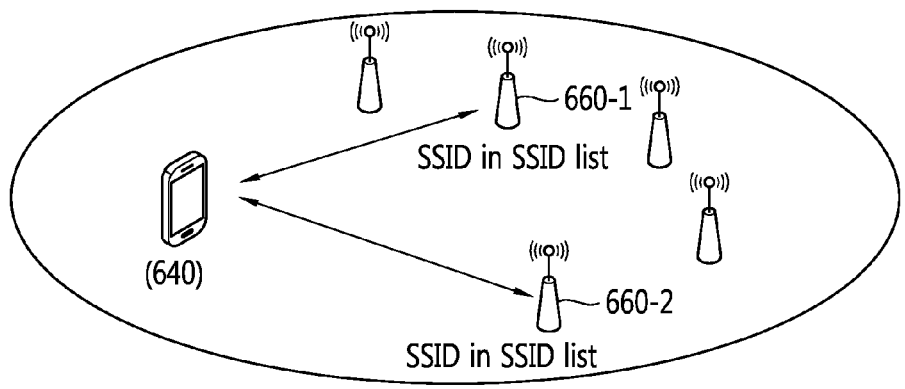
probe request frame (660)
(SSID, wildcard BSSID)   (C)

SCANNING METHOD AND SCANNING APPARATUS IN WIRELESS LAN

This application is a 35 USC §371 National Stage entry of International Application No. PCT/KR2013/004164 filed on May 10, 2013, which claims priority to U.S. Provisional Application Nos. 61/645,063 filed on May 10, 2012, both of which is hereby incorporated by reference in their entirety.

BACKGROUND OF THE INVENTION

1. Field of the Invention

The present invention relates to a scanning method and apparatus and, more particularly, to a method and apparatus for an active scanning performed by station (STA).

2. Related Art

Recent Wireless LAN (WLAN) technology is basically evolving into three directions. There are Institute of Electrical and Electronic Engineers (IEEE) 802.11 ac and IEEE 802.11 ad as efforts to further increase the transfer rate on the extension line of the existing WLAN evolution direction. IEEE 802.11 ad is WLAN technology using a 60 GHz band. Furthermore, a wide area WLAN that utilizes a frequency band of less than 1 GHz in order to enable wider area transfer than that of the existing WLAN in distance is recently emerging. The wide-area WLAN includes IEEE 802.11af utilizing a TV White Space (TVWS) band and IEEE 802.11ah utilizing a 900 MHz band. A main object of the wide-area WLANs is to extend extended range Wi-Fi service as well as a smart grid and a wide-area sensor network. Furthermore, the existing WLAN Medium Access Control (MAC) technology is problematic in that an initial link setup time is very long according to circumstances. In order to solve this problem and in order for an STA to rapidly access an AP, IEEE 802.11ai standardization is recently carried out actively.

IEEE 802.11ai is MAC technology in which a rapid authentication procedure is handled in order to significantly reduce the initial setup and association time of a WLAN, and standardization activities for IEEE 802.11 ai has started as a formal task group on January, 2011. In order to enable a rapid access procedure, in IEEE 802.11ai, a discussion on procedure simplification in fields, such as AP discovery, network discovery, Time Synchronization Function (TSF) synchronization, authentication & association, and a procedure convergence with a higher layer, is in progress. From among them, ideas, such as procedure convergence utilizing the piggyback of a Dynamic Host Configuration Protocol (DHCP), the optimization of a full Extensible Authentication Protocol (EAP) using a concurrent IP, and efficient and selective Access Point (AP) scanning, are being actively discussed.

SUMMARY OF THE INVENTION

An object of the present invention is to provide a scanning method.

Another object of the present invention is to provide an apparatus for performing a scanning method.

In an aspect, a scanning method in a wireless LAN may include receiving a first probe request frame from a first station (STA) by an access point (AP), unicasting a first probe response frame as a response to the first probe request frame to the first STA by the AP, starting timer after unicasting the first probe response frame, receiving a second probe request frame from a second STA during the timer is operating and broadcasting a second probe response frame as a response to the second probe request frame, the timer may be terminated when transmitting a passive scanning frame and the first probe request frame may be received while the timer is not operating. The timer may be terminated based on a target beacon transmission time (TBTT) when the beacon frame is transmitted.

Also, a scanning method in a wireless LAN may include receiving a first probe request frame from a first station (STA) by an access point (AP), unicasting a first probe response frame as a response to the first probe request frame to the first STA by the AP, receiving a second probe request frame from a second STA during a specific time section (duration) after unicasting the first probe response frame to the first STA, and broadcasting a second probe response frame as a response to the second probe request frame during the specific time section, the specific time section may be started when the first probe request frame may be transmitted and is terminated when a passive scanning frame is transmitted.

In another aspect, a wireless apparatus in a wireless LAN system may include a processor, the processor may be configured to perform receiving a first probe request frame from a first station (STA) by an access point (AP), unicasting a first probe response frame as a response to the first probe request frame to the first STA by the AP, starting timer after unicasting the first probe response frame, receiving a second probe request frame from a second STA during the timer is operating and broadcasting a second probe response frame as a response to the second probe request frame, the timer may be terminated when transmitting a passive scanning frame and the first probe request frame may be received while the timer is not operating, the timer may be terminated based on a target beacon transmission time (TBTT) when the beacon frame is transmitted.

Also, a wireless apparatus in a wireless LAN system may include a processor, the processor may be configured to perform receiving a first probe request frame from a first station (STA) by an access point (AP), unicasting a first probe response frame as a response to the first probe request frame to the first STA by the AP, receiving a second probe request frame from a second STA during a specific time section after unicasting the first probe response frame to the first STA, and broadcasting a second probe response frame as a response to the second probe request frame during the specific time section, the specific time section may be started when the first probe request frame may be transmitted and is terminated when a passive scanning frame is transmitted.

The scanning procedure can be quickly performed.

BRIEF DESCRIPTION OF THE DRAWINGS

FIGS. 1(A) and (B) are conceptual diagrams illustrating the configuration of a Wireless Local Area Network (WLAN).

FIGS. 6(A), (B) and (C) are conceptual diagrams illustrating a method of transmitting a probe request frame.

DESCRIPTION OF EXEMPLARY EMBODIMENTS

FIG. 1 is a conceptual diagram illustrating the configuration of a Wireless Local Area Network (WLAN).

FIG. 1 (A) shows the configuration of an infrastructure network according to Institute of Electrical and Electronic Engineers (IEEE) 802.11.

Referring to FIG. 1 (A), the WLAN system may include one or more Basic Service Sets (BSSs) 100 and 105. The BSSs 100 and 105, and each is a set of an AP and an STA, such as an Access Point (AP) 125 and a Station (STA1) 100-1 which are successfully synchronized with each other and capable of communicating with each other. The BSS is not a concept indicative of a specific area. The BSS 105 may include one or more STAs 105-1 and 105-2 that may be associated in one AP 130.

An infrastructure BSS may include at least one STA, the APs 125 and 130 providing distribution service, and a Distribution System (DS) 110 coupling a plurality of APs.

The distribution system 110 may implement an Extended Service Set (ESS) 140 by coupling some BSSs 100 and 105. The ESS 140 may be used as a term that indicates one network over which one or more APs 125 and 230 are connected through the distribution system 110. APs included in one ESS 140 may have the same service set identification (SSID).

A portal 120 may function as a bridge for connecting between a WLAN network (i.e., IEEE 802.11) and another network (e.g., 802.X).

In an infrastructure network, such as that of the upper portion (A) of FIG. 1, a network between the APs 125 and 130 and a network between the APs 125 and 130 and the STAs 100-1, 105-1, and 105-2 may be implemented. However, a network may be configured between STAs so that the STAs may perform communication even without the APs 125 and 130. A network that is configured between STAs so that the STAs may perform communication without the APs 125 and 130 is defined as an Ad-Hoc network or an independent Basic Service Set (BSS).

FIG. 1 (B) is a conceptual diagram illustrating an independent BSS.

Referring to FIG. 1 (B), the Independent BSS (IBSS) is a BSS that operates in an Ad-Hoc mode. The IBSS does not include a centralized management entity because it does not include an AP. That is, in the IBSS, STAs 150-1, 150-2, 150-3, 155-4, and 155-5 are managed in a distributed manner. In the IBSS, all the STAs 150-1, 150-2, 150-3, 155-4, and 155-5 may be mobile STAs, and they form a self-contained network because they cannot access a distribution system.

An STA is a specific function medium, including Medium Access Control (MAC) that complies with the rules of the IEEE 802.11 standard and a physical layer interface for a radio medium, and may be used as a meaning that includes both an AP STA and a non-AP STA in a broad sense.

An STA may be called in various names, such as a mobile terminal, a wireless device, a Wireless Transmit/Receive Unit (WTRU), a User Equipment (UE), a Mobile Station (MS), a mobile subscriber unit, or simply a user.

Figure 2:
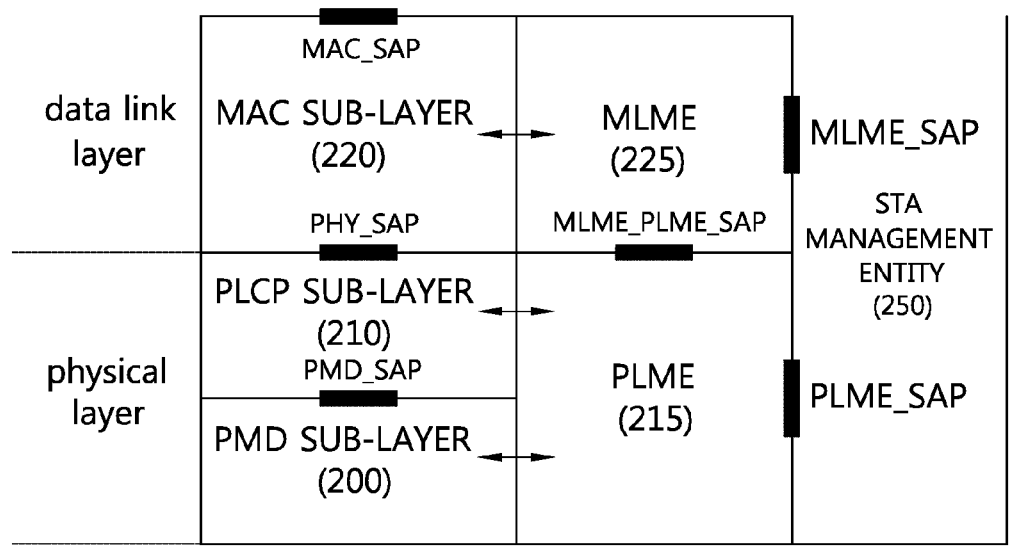
FIG. 2 is a diagram illustrating the hierarchical architecture of a WLAN system that is supported by IEEE 802.11.

FIG. 2 is a diagram illustrating the hierarchical architecture of a WLAN system that is supported by IEEE 802.11.

FIG. 2 schematically shows the PHY architecture of the WLAN system.

The PHY architecture of the WLAN system may include a Medium Access Control (MAC) sublayer 220, a Physical Layer Convergence Procedure (PLCP) sublayer 210, and a Physical Medium Dependent (PMD) sublayer 200. The PLCP sublayer 210 is implemented so that the MAC sublayer 220 may operate with minimum dependency on the PMD sublayer 200. The PMD sublayer 200 may function as a transmission interface through which data is transmitted and received between a plurality of STAs.

The MAC sublayer 220, the PLCP sublayer 210, and the PMD sublayer 200 may include a management entity conceptually.

The management entity of the MAC sublayer 220 is called a MAC Layer Management Entity (MLME) 225, and the management entity of the PHY layer is called a PHY Layer Management Entity (PLME) 215. The management entities may provide interfaces through which a layer management operation is performed. The PLME 215 is connected to the MLME 225 and capable of performing the management operation of the PLCP sublayer 210 and the PMD sublayer 200. The MLME 225 may also be connected to the PLME 215 and capable of performing the management operation of the MAC sublayer 220.

In order for a correct MAC layer operation to be performed, an STA Management Entity (SME) 250 may be existed. The SME 250 may operate as an element unit that is independent of the layer. In the MLME, the PLME, and the SME, information may be transmitted and received between element units based on primitives.

An operation in each sublayer is disclosed below in brief. The PLCP sublayer 210 transfers a MAC Protocol Data Unit (MPDU), received from the MAC sublayer 220, to the PMD sublayer 200 or transfers a frame, received from the PMD sublayer 200, to the MAC sublayer 220 under the instruction of the MAC layer between the MAC sublayer 220 and the PMD sublayer 200. The PMD sublayer 200 may transmit and receive data between a plurality of STAs through a radio medium as a PLCP lower layer. The MPDU transferred by the MAC sublayer 220 is called a Physical Service Data Unit (PSDU) in the PLCP sublayer 210. The MPDU is similar to the PSDU, but each MPDU may be different from each PSDU if an Aggregated MPDU (A-MPDU) in which a plurality of MPDUs are aggregated is transferred.

The PLCP sublayer 210 adds an additional field, including information necessary for a physical layer transmitter/receiver, in a process of receiving the PSDU from the MAC sublayer 220 and transferring the received PSDU to the PMD sublayer 200. Here, the added field may be a PLCP preamble, a PLCP header, and tail bits necessary to return a convolution encoder to a zero state in the PSDU. The PLCP preamble may function to enable a receiver to prepare a synchronization function and antenna diversity before the PSDU is transmitted. A data field may include padding bits, a service field including a bit sequence for initializing a scrambler, and a coded sequence encoded from a bit sequence to which tail bits have been added in the PSDU. Here, Binary Convolutional Coding (BCC) encoding or Low Density Parity Check (LDPC) encoding may be selected as an encoding method depending on an encoding method supported for an STA that receives a PLCP Protocol Data Unit (PPDU). The PLCP header may include a field including information about the PPDU.

In the PLCP sublayer 210, the PPDU is generated by adding the above-described field to the PSDU and transmitted to a reception STA via the PMD sublayer 200. The reception STA receives the PPDU, obtains information necessary to restore data from the PLCP preamble and the PLCP header, and restores the data using the information.

Figure 3:
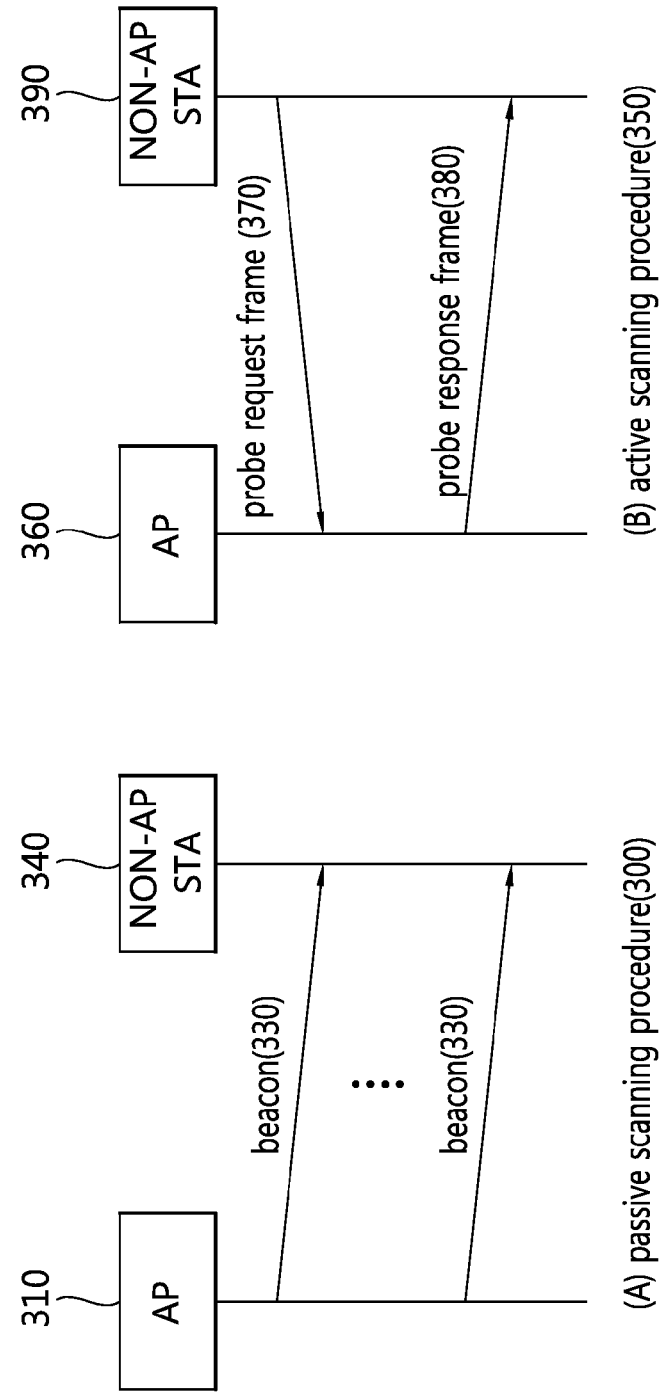
FIGS. 3(A) and (B) are conceptual diagrams illustrating a scanning method in a WLAN.

FIG. 3 is a conceptual diagram illustrating a scanning method in a WLAN.

Referring to FIG. 3, the scanning method may be divided into a passive scanning procedure 300 and an active scanning procedure 350.

Referring to FIG. 3 (A), the passive scanning procedure 300 may be performed in response to a beacon frame 330 that is periodically broadcasted by an AP 310. The AP 310 of a WLAN broadcasts the beacon frame 330 to a non-AP STA 340 in a specific cycle (e.g., 100 msec). The beacon frame 330 may include information about a current network. The non-AP STA 340 may receive the periodically broadcasted beacon frame 330, receive network information from the beacon frame 330, and perform scanning on a channel along with the AP 310 with which an authentication/association process will be performed based on the network information.

In the passive scanning method 300, the non-AP STA 340 has only to receive the beacon frame 330 transmitted by the AP 310 without transmitting a frame. Accordingly, the passive scanning procedure 300 is advantageous in that overall overhead generated due to the transmission and reception of data over a network is small. However, the passive scanning procedure 300 is disadvantageous in that the time taken to perform scanning is increased because scanning is inevitably manually performed in proportion to the cycle of the beacon frame 330. A detailed description of the beacon frame is disclosed in 8.3.3.2 Beacon Frame of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)' disclosed on November, 2011. In IEEE 802.11ai, a beacon frame having another format may be additionally used, and this beacon frame may be called a (Fast Initial Link Setup (FILS)) beacon frame. Furthermore, a measurement pilot frame is a frame that uses only some information of the beacon frame and may be used in a scanning procedure. The measurement pilot frame is disclosed in an IEEE 802.11 8.5.8.3 measurement pilot format.

Referring to FIG. 3 (B), the active scanning procedure 350 refers to a method in which a non-AP STA 390 initiatively performs scanning by transmitting a probe request frame 370 to an AP 360.

After receiving the probe request frame 370 from the non-AP STA 390, the AP 360 may wait for a random time in order to prevent a collision between frames, include network information in a probe response frame 380, and transmit the probe response frame 380 to the non-AP STA 390. The non-AP STA 390 may obtain the network information based on the received probe response frame 380 and stop the scanning process.

The active scanning procedure 350 is advantageous in that the time taken to perform scanning is short because the non-AP STA 390 initiatively performs scanning. However, the active scanning procedure 350 is disadvantageous in that network overhead for the transmission and reception of frames is increased because the non-AP STA 390 needs to transmit the probe request frame 370. The probe request frame 370 is disclosed in Paragraph IEEE 802.11 8.3.3.9, and the probe response frame 380 is disclosed in Paragraph IEEE 802.11 8.3.3.10.

After terminating the scanning, the AP and the STA may perform authentication and association processes.

Figure 4:
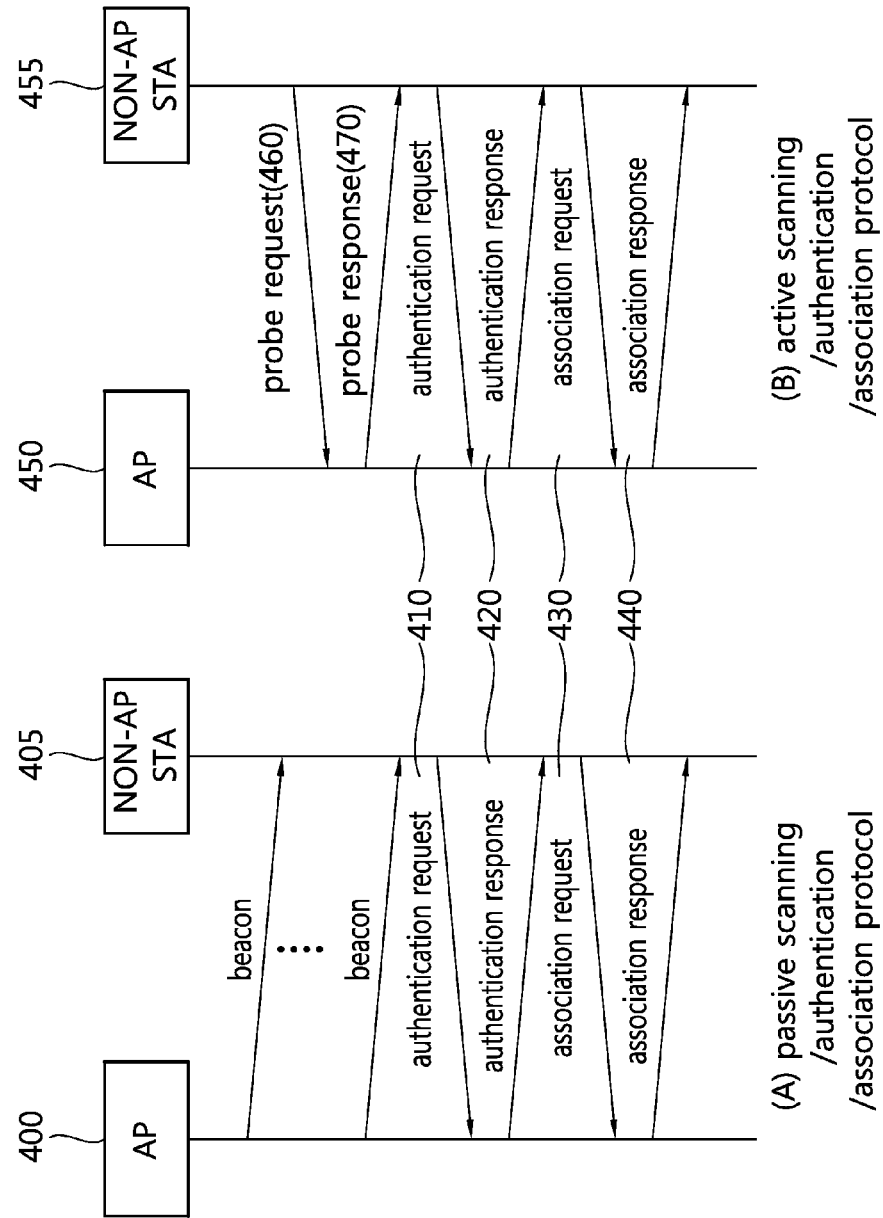
FIGS. 4(A) and (B) is are conceptual diagrams illustrating authentication and association process after the scanning of an AP and an STA.

FIG. 4 is a conceptual diagram illustrating authentication and association processes after the scanning of an AP and an STA.

Referring to FIG. 4, after passive/active scanning is performed, authentication and association processes may be performed with one of scanned APs.

The authentication and association processes may be performed, for example, by way of 2-way handshaking. The left portion (A) of FIG. 4 is a conceptual diagram illustrating authentication and association processes after passive scanning, and the right portion (B) of FIG. 4 is a conceptual diagram illustrating authentication and association processes after active scanning.

The authentication and association processes may be equally performed by exchanging an authentication request frame 410/an authentication response frame 420 and an association request frame 430/an association response frame 440 between APs 400 and 450 and non-AP STAs 405 and 455 irrespective of whether an active scanning method or a passive scanning method has been used.

The authentication process may be performed when the non-AP STAs 405 and 455 transmit the authentication request frame 410 to the respective APs 400 and 450. In response to the authentication request frame 410, the APs 400 and 450 may transmit the authentication response frame 420 to the respective non-AP STAs 405 and 455. An authentication frame format is disclosed in IEEE 802.11 8.3.3.11.

The association process may be performed when the non-AP STAs 405 and 455 transmit the association request frame 430 to the respective APs 400 and 450. In response to the association request frame 430, the APs 400 and 450 may transmit the association response frame 440 to the respective non-AP STAs 405 and 455. The transmitted association request frame 430 includes information about the capabilities of the non-AP STAs 405 and 455. The APs 400 and 450 may determine whether support for the non-AP STAs 405 and 455 is possible or not based on the capability information of the non-AP STAs 405 and 455. If, as a result of the determination, it is determined that support for the non-AP STAs 405 and 455 is possible, the APs 400 and 450 may include information about whether or not the association request frame 430 has been accepted, a reason for the acceptance, and information about capabilities supportable by the APs 400 and 450 in the association response frame 440 and transmit the association response frame 440 to the non-AP STA 405 and 455. An association frame format is disclosed in IEEE 802.11 8.3.3.5/8.3.3.6.

If up to the association process is performed, data is normally transmitted and received. If the association process is not performed, association is performed again based on a reason that the association process has not been performed, or association with another AP may be performed.

Figure 5:
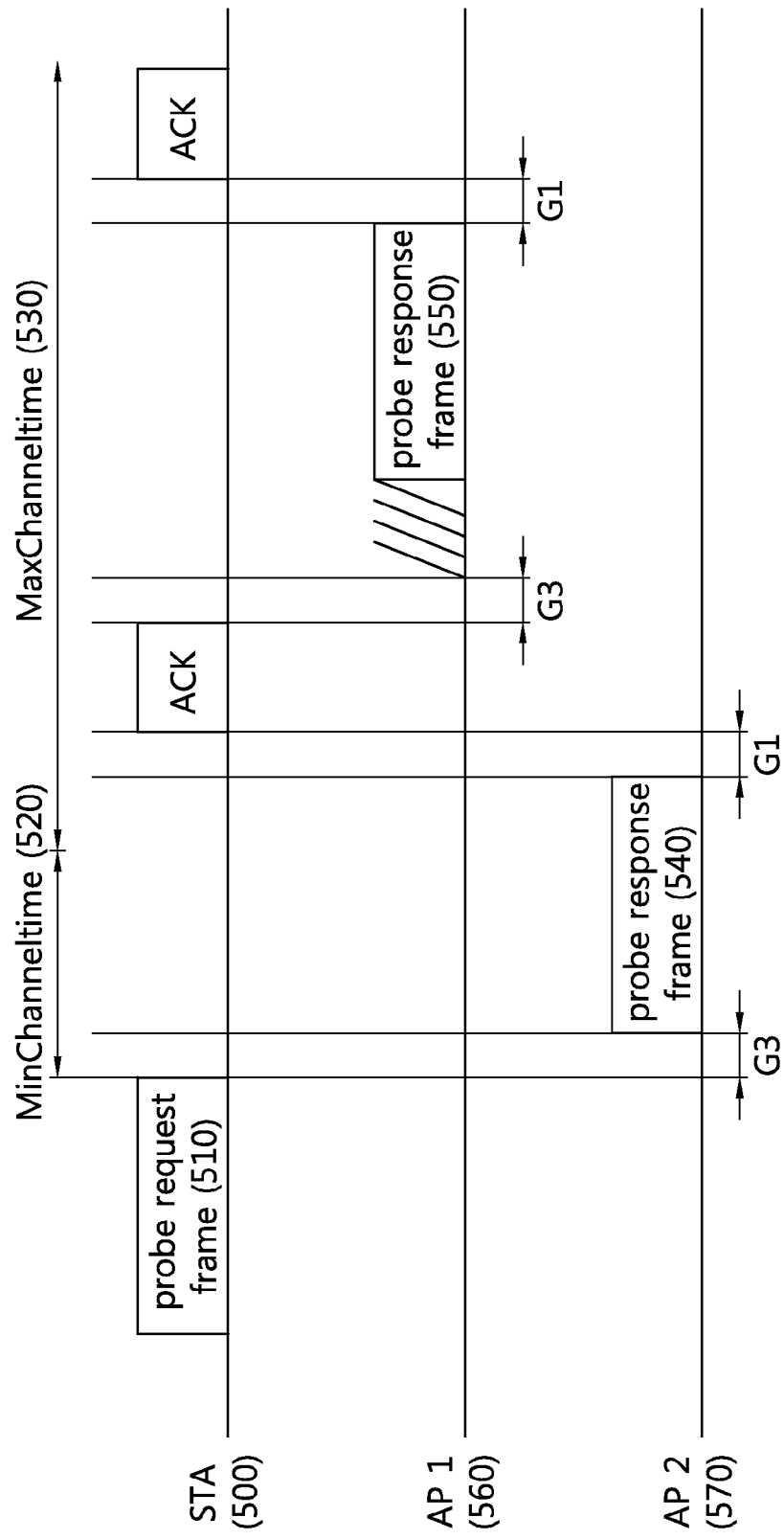
FIG. 5 is a conceptual diagram illustrating an active scanning procedure.

FIG. 5 is a conceptual diagram illustrating an active scanning procedure.

Referring to FIG. 5, the active scanning procedure may be performed in accordance with the following steps.

(1) Determine whether or not an STA 500 is ready to perform the active scanning procedure.

The STA 500 may perform active scanning, for example, when a probe delay time expires or after waiting until it receives specific signaling information (e.g., PHY-RX-START.indication primitive).

The probe delay time is delay generated before the STA 500 transmits a probe request frame 510 when performing active scanning. The PHY-RXSTART.indication primitive is a signal that is transmitted from a PHY layer to a local MAC layer. The PHY-RXSTART.indication primitive may signal information, indicating that a PLCP Protocol Data Unit (PPDU) including a valid Physical Layer Convergence Protocol (PLCP) header has been received from a PLCP, through the MAC layer.

(2) Perform basic access.

In the 802.11 MAC layer, several STAs may share a radio medium using, for example, a Distributed Coordination Function (DCF) that is a contention-based function. The DCF may prevent a collision between STAs through a back-off scheme using Carrier Sense Multiple Access/Collision Avoidance (CSMA/CA) as an access protocol. The STA 500 may transmit the probe request frame 510 to APs 560 and 570 in accordance with a basic access method.

(3) Include information (e.g., service set identification (SSID) and basic service set identification (BSSID) information) for specifying the APs 560 and 570, included in an MLME-SCAN.request primitive, in the probe request frame 510 and transmit the probe request frame 510.

The BSSID is an indicator for specifying APs, and the BSSID may have a value corresponding to the MAC address of the AP. The SSID is a network name for specifying APs, which may be read by a person who operates an STA. The BSSID and/or the SSID may be used to specify APs.

The STA 500 may specify APs based on the information for specifying the APs 560 and 570, which is included in the MLME-SCAN.request primitive. The specified APs 560 and 570 may transmit respective probe response frames 550 and 540 to the STA 500. The STA 500 may unicast, multi-cast, or broadcast the probe request frame 510 by transmitting the probe request frame 510 including information about an SSID and BSSID. A method of unicasting, multi-casting, or broadcasting the probe request frame 510 based on the SSID and BSSID information will be additionally described with reference to FIG. 5.

For example, if an SSID list is included in the MLME-SCAN.request primitive, the STA 500 may transmit the probe request frame 510 including the SSID list. The APs 560 and 570 may receive the probe request frame 510, determine SSIDs included in the SSID list that has been included in the received probe request frame 510, and determine whether or not to transmit the probe response frames 550 and 540 to the STA 500 based on the determined SSIDs.

(4) Reset a probe timer to 0 and drive the probe timer.

The probe timer may be used to check a minimum channel time (MinChanneltime) 520 and a maximum channel time (MaxChanneltime) 530. The minimum channel time 520 and the maximum channel time 530 may be used to control the active scanning operation of the STA 500.

The minimum channel time 520 may be used for the STA 500 to perform an operation of changing a channel on which active scanning is performed. For example, if the STA 500 has not received the probe response frames 550 and 540 until the probe timer reaches the minimum channel time 520, the STA 500 may change a current scanning channel into another scanning channel and perform scanning on another channel. If the STA 500 receives the probe response frame 550 before the probe timer reaches the minimum channel time 520, when the probe timer reaches the maximum channel time 530, the STA 500 may process the received probe response frames 540 and 550.

The STA 500 may discover a PHY-CCA.indication primitive before the probe timer reaches the minimum channel time 520 and determine whether or not other frames (e.g., the probe response frames 540 and 550) have been received before the minimum channel time 520.

The PHY-CCA.indication primitive may transmit information about the state of a medium from a physical layer to a MAC layer. The PHY-CCA.indication primitive may inform the state of a current channel using a channel state parameter indicative of a busy state (simply called busy) when a channel is not available and of an idle state (simply called idle) when a channel is available. If the PHY-CCA.indication is discovered to be busy, the STA 500 may determine that the probe response frames 550 and 540 received by the STA 500 are existed. If the PHY-CCA.indication is discovered to be idle, the STA 500 may determine that the probe response frames 550 and 540 received by the STA 500 are not existed.

If the PHY-CCA.indication is discovered to be idle, the STA 500 may set a Net Allocation Vector (NAV) to 0 and scan a next channel. If the PHY-CCA.indication is discovered to be busy, the STA 500 may perform processing on the probe response frames 550 and 540 that are received after the probe timer reaches the maximum channel time 530. After performing processing on the received probe response frames 550 and 540, the STA 500 may set the NAV to 0 and scan a next channel.

In the following embodiments of the present invention, to determine whether the probe response frames 550 and 540 received by the STA 500 are existed or not may include the meaning that a channel state is determined using the PHY-CCA.indication primitive.

(5) An MLME may signal an MLME-SCAN.confirm primitive if all channels included in a channel list (ChannelList) are scanned. The MLME-SCAN.confirm primitive may include BSSDescriptionSet that includes all pieces of information obtained in a scanning process.

If an active scanning method is used, the STA 500 may perform monitoring for determining whether the PHY-CCA.indication parameter is busy or not until the probe timer reaches the minimum channel time.

Detailed information included in the MLME-SCAN.request primitive is as follows. An STA may receive the MLME-SCAN.request primitive from the MLME in order to perform scanning. The MLME-SCAN.request primitive is generated by the SME. The MLME-SCAN.request primitive may be used to determine whether another BSS with which an STA will be associated is present or not.

The MLME-SCAN.request primitive may include pieces of information, such as BSSType, BSSID, SSID, ScanType, ProbeDelay, ChannelList, MinChannelTime, MaxChannelTime, RequestInformation, SSID List, ChannelUsage, AccessNetworkType, HSSID, and MeshID, VendorSpecificInfo. A detailed description of the MLME-SCAN.request primitive is disclosed in 6.3.3.2 MLME-SCAN.request of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' disclosed on November, 2011.

Table 1 below schematically shows information included in the MLME-SCAN.request primitive.

TABLE 1

| Name | Description |
|---|---|
| BSSType | Determines whether an infrastructure BSS, IBSS, Mesh Basic Service Set (MBSS) or all of them are included in the scan. |
| BSSID | Identifies a specific or wildcard BSSID. |
| SSID | Specifies a desired SSID or a wildcard SSID. |
| Scan Type | Indicates either active or passive scanning. |
| ProbeDelay | Delay (in microseconds) to be used before transmitting a probe frame during active scanning. |
| ChannelList | Specifies a list of channels that are examined when scanning a BSS. |
| MinChannelTime | A minimum time (in TU) to spend on each channel when scanning. |
| MaxChannelTime | A maximum time (in TU) to spend on each channel when scanning. |
| RequirementInformation | This element is optionally present if dot11RatioMeasurementActivated is true and is placed in a probe request frame to request that a responding STA includes requested information in the probe response frame. |
| SSID List | One or more SSID elements that are optionally present when dot11RatioMeasurementActivated is true. |
| ChannelUsage | Specifies request types for a ChannelUsage request. |
| AccessNetworkType | Specifies a desired specific access network type or a wildcard access network type. This field is present when dot11InterworkingServiceActivated is true. |
| HESSID | Specifies a desired specific HESSID network identifier or a wildcard network identifier. This field is present when dot11InterworkingServiceActivated is true. |
| Mesh ID | Only present if BSSType = MESH or BSSType = ANY_BSS Specifies a desired Mesh ID or a wildcard Mesh ID. |
| RequestParameters | This parameter defines responding STAs. |
| ReportingOption | Indicate a result reporting mode. |
| APConfigurationChangeCount | When a specific BSSID is indicated in the MLME-SCAN- request, the APConfigurationChangeCount associated with the stored configuration of an AP is optionally provided. |
| VendorSpecificInfo | Information individually added according to a service provider. |

A request parameter included in the MLME-SCAN.request.primitive may be used to determine whether or not a responding STA will transmit a probe response frame. The request parameter may include information to request that the information of another BSS be included in the probe response frame. The request parameter may further include a report request field, a delay reference field, and a maximum delay limit field.

The report request field is information to request that information of another BSS be included in the probe response frame. The delay reference field may include information about a delay type that is applied as a response to the probe request frame. The maximum delay limit field may include maximum access delay information about a delay type which is indicated by the delay reference field.

In addition, the request parameter may further include a minimum data rate field or a received signal intensity limit field or both. The minimum date rate field includes information about the lowest total data rate in transmitting an MSDU or an A-MSDU. The received signal intensity limit field may include information about the limit value of a signal that is necessary for the receiver of the probe request frame to respond to the probe request frame.

FIG. 6 is a conceptual diagram showing a method of transmitting a probe request frame.

FIG. 6 discloses a method of an STA broadcasting, multi-casting, or unicasting, a probe request frame.

FIG. 6 (A) shows a method of an STA 600 broadcasting a probe request frame 610.

The STA 600 may include a wildcard SSID and a wildcard BSSID in the probe request frame 610 and then broadcast the probe request frame 610.

The wildcard SSID and the wildcard BSSID may be used as identifiers for indicating all APs 605-1, 605-2, 605-3, 605-4, and 605-5 which are included in the transmission coverage of the STA 600.

If the STA 600 transmits the probe request frame 610 including the wildcard SSID and the wildcard BSSID, the APs 605-1, 605-2, 605-3, 605-4, and 605-5 may transmit probe response frames to the STA 600 in response to the probe request frame 610.

If the APs 605-1, 605-2, 605-3, 605-4, and 605-5 transmit the probe response frames to the STA 600 within a specific time in response to the broadcasted probe request frame 610, a problem may occur because the STA 600 has to receive too many probe response frames and process the received probe response frames at once.

FIG. 6 (B) is a method of an STA 620 unicasting a probe request frame 630.

Referring to FIG. 6 (B), if the STA 620 unicasts the probe request frame 630, the STA 620 may transmit the probe request frame 630 including information about a specific SSID/BSSID of an AP. Only an AP 625 corresponding to the SSID/BSSID specified by the STA 620, from among APs which have received the probe request frame 630, may transmit a probe response frame to the STA 620.

FIG. 6 (C) is a method of an STA 640 multi-casting a probe request frame 660.

Referring to FIG. 6 (C), the STA 640 may include an SSID list and a wildcard BSSID in the probe request frame 660 and then transmit the probe request frame 660. APs 660-1 and 660-2 corresponding to SSIDs included in the SSID list that has been included in the probe request frame 660, from among APs which have received the probe request frame 660, may transmit probe response frames to the STA 640.

According to whether the STA uses the passive scanning or the active scanning as a method of scanning, the STA has the respective drawbacks. For example, in case of performing the passive scanning, the STA should wait until the bacon frame transmission cycle is returned and the AP transmits the beacon frame. That is, long delay may occur till the STA receives the beacon frame. Also, when performing the passive scanning, the short beacon frame or the measurement pilot may be used. In this case, since the transmission cycle of the frame is shorter than that of the beacon frame but frequently being transmitted, and this may cause unnecessary waste resource and increase the power consumption of the AP. On the other hand, in case that many STA transmits the probe request frame and performs the active scanning, the flooding may occur due to unnecessary transmission and reception of the probe request frame and the probe response frame.

The delay which is permissible when the STA scans the AP may have different values according to the STA. For example, according to the application which is operated in the STA of a specific user, the permissible delay may have different value. For example, when performing scanning, whether to perform the real-time data transmission (i.e., the video streaming) or the non-real-time data transmission (i.e., the file transfer protocol (ftp) file downloading), different delays should be satisfied.

According to the scanning delay which is permissible by the STA, the passive scanning or the active scanning may be used for the scanning method. For example, in case of the STA that is not sensitive to the delay, the STA may scan the APs by performing the passive scanning. On the other hand, in case of the STA that is sensitive to the delay, the STA may scan the APs by performing the active scanning. As the reference to select the scanning type of the STA, the delay requirements (i.e., 100 ms) for 802.11ai initial link configuration may be applied.

In case that a channel is idle, the STA may easily secure the transmission channel and transmit the probe request frame, and receive the probe response frame which is the response to the probe request frame. Accordingly, in case that a channel is idle, the STA may scan APs through the active scanning. On the contrary, in case that a channel is busy, since the STA is unable to secure the transmission channel, there is a strong possibility that the STA is unable to transmit the probe request frame. In such a case, in case of performing the passive scanning rather, the STA may scan the APs much more quickly.

Hereinafter, in an embodiment of the present invention, a method that a STA scans APs will be described.

Figure 7:
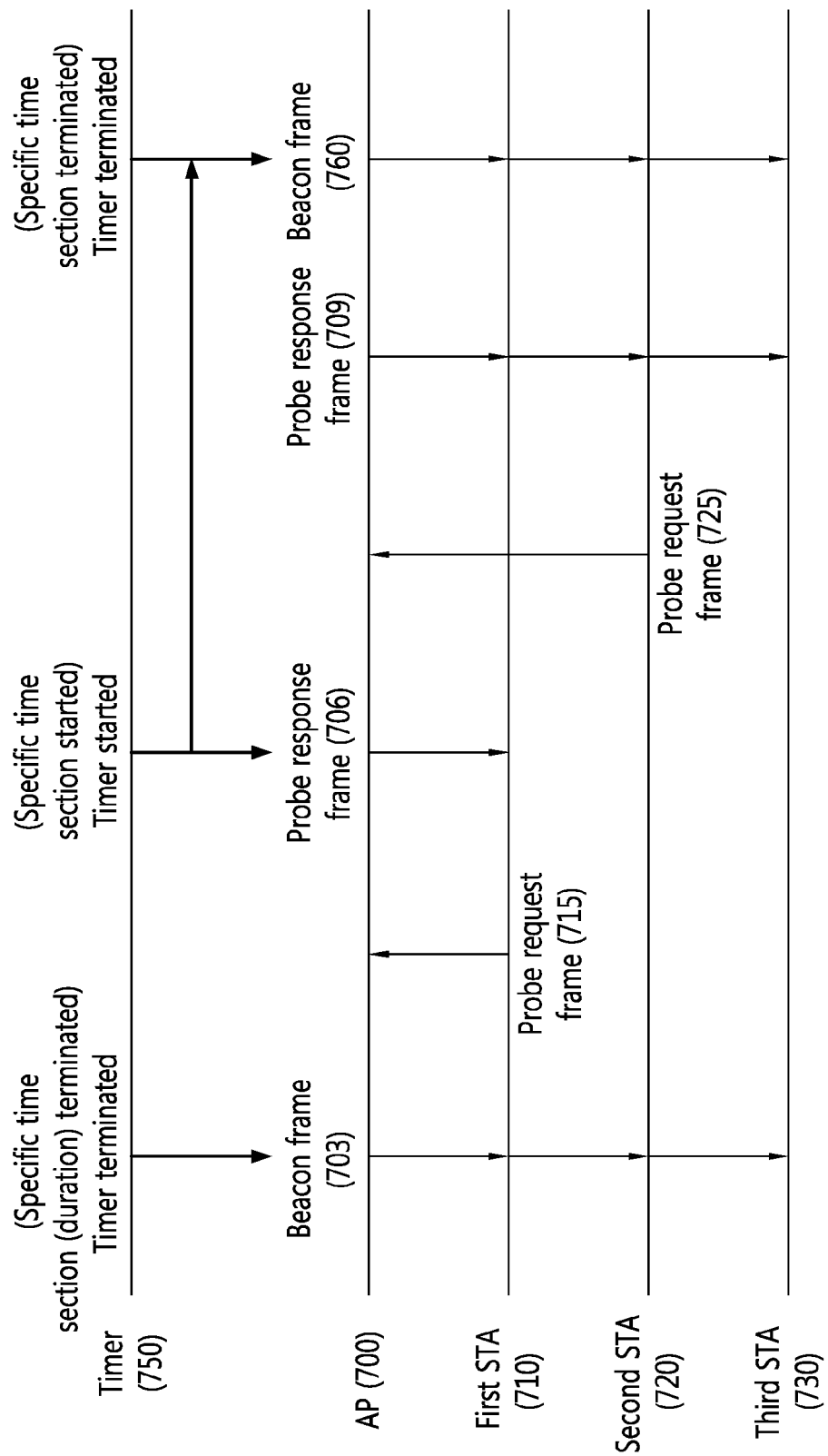
FIG. 7 is a conceptual diagram illustrating the operation of AP according to an embodiment of the present invention.

FIG. 7 is a conceptual diagram illustrating the operation of AP according to an embodiment of the present invention.

Referring to FIG. 7, an AP 700 may receive the probe request frame 715 from a first STA 710.

The AP 700 may transmit the probe response frame 706 as a response to the probe request frame 715 which is received from the first STA 710.

The AP 700 may determine whether to broadcast or unicast the probe response frame 706 by determining whether the probe request frame 715 transmitted from the first STA 710 is the first probe request frame after a timer 750 is terminated. The timer 750 may be used for determining whether to broadcast or unicast the probe response frame 706.

If the probe request frame 715 transmitted from the first STA 710 is the probe request frame which is firstly transmitted after the timer 750 is terminated, the AP may perform unicast. The timer 750 is started at the time when the probe request frame 715 is transmitted by unicast and terminated at the time when the beacon frame 760 is transmitted.

Hereinafter, in FIG. 7, it is assumed that the probe request frame 715 transmitted by the first STA 710 is the probe request frame which is firstly received by the AP 700 after the timer 750 is terminated. The AP 700 may unicast the probe response frame 706 to the first STA 710 as a response to the probe request frame 715 which is received from the first STA 710.

The timer 750 may be started after the AP 700 unicasts the probe response frame 706 as a response to the probe request frame 715 which is received from the first STA 710. After the timer 750 is started and before terminated, a second STA 720 may transmit the probe request frame 725 to the AP 700.

The AP 700 may broadcast the probe response frame 709 as a response to the probe request frame 725 which is transmitted from the second STA 720.

According to the embodiment of the present invention, after the timer 750 is started, the probe response frame 709 transmitted from the AP 700 may be broadcasted. By using the transmission method, a third STA 730 except the first STA 710 and the second STA 720 may receive the probe response frame 709 which is broadcasted by the AP 700 and perform the scanning. After the timer 750 is terminated (i.e., after transmitting the beacon frame 760) and before the timer 750 is started, the AP 700 may unicast the probe response frame 709 as a response to the probe request frame 725 received. The operation of the third STA 730 will be described below in detail.

The timer 750 may be variously configured. For example, the timer 750 may be started when the AP 700 unicasts the probe response frame 706 and terminated when the cycle that the AP 700 transmits the beacon frame 760 is returned. The cycle of transmitting the beacon frame 760 may be a target beacon transmission time (TBTT). The TBTT is the cycle that the AP 700 transmits the beacon frame 760, may have the value of time unit (TU). It may also possible to newly define the cycle that the timer 750 is terminated and used. For example, the cycle that the timer 750 is terminated may be configured as the cycle that other scanning frame is transmitted. The other scanning frame may be a fast initial link setup (FILS) beacon frame, a measurement pilot frame, and so on.

In the embodiment of the present invention, for the convenience of description, the method for deciding the transmission method for the probe response frame on the basis of the timer, but the transmission method for the probe response frame may be decided not on the basis of the timer. A certain time interval may be the time interval that may be reference for deciding whether to unicast or broadcast the probe response frame as the transmission method. In the certain time interval, the AP may broadcast the probe response frame, and out of the certain time interval, the AP may unicast the probe response frame. For example, the certain time interval may be started after the AP receives the first probe request frame from the first STA and the AP unicasts the first probe response frame as a response to the first probe request frame to the first STA.

That is, after unicasting the first probe response frame to the first STA, the AP may receive the second probe request frame from the second STA for the certain time interval and broadcast the second probe response frame as a response to the second probe request frame for the certain time interval. The certain time interval may be terminated based on the cycle of the passive scanning frame (i.e., the beacon frame, the fast initial link setup (FILS) beacon frame and the measurement pilot frame).

Figure 8:
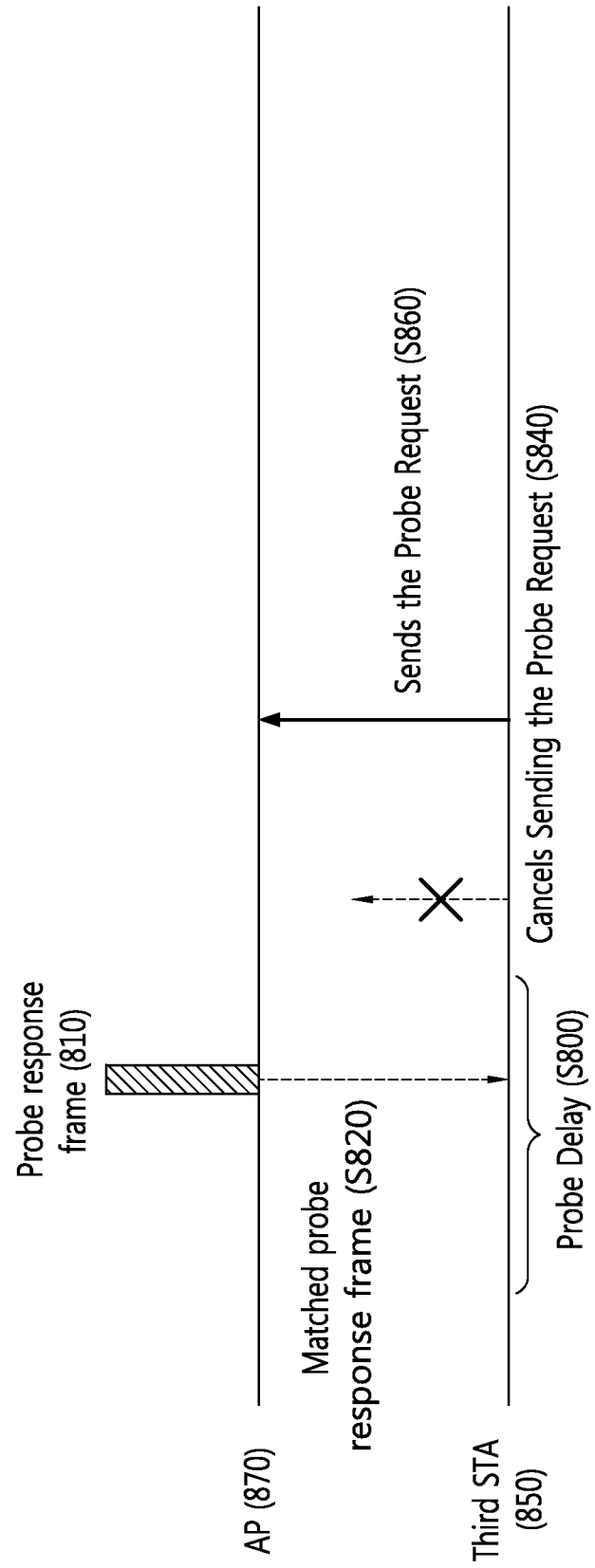
FIG. 8 is a conceptual diagram illustrating the operation of the STA according to an embodiment of the present invention.

FIG. 8 is a conceptual diagram illustrating the operation of the STA according to an embodiment of the present invention.

Referring to FIG. 8, a third STA 850 may decide whether the probe response frame 810 which is broadcasted from an AP 870 is the matched probe response frame (step, S820).

The third STA 850 may determine whether the received probe response frame 810 is the matched probe response frame. For example, the third STA 850 may determine whether the probe response frame is the matched probe response frame based on the information of MLME-SCAN-.request.primitive and the information included in the probe response frame 810.

For example, if the identification information (i.e., the BSSID and the SSID) of the AP included in the MLME-SCAN.request.primitive and the identification information of the AP 870 that transmits the probe response frame 810 are identical, the third STA 850 may determine the probe response frame 810 to be the matched probe response frame. Otherwise, the third STA 850 may determine whether the probe response frame is the matched probe response frame based on the information of MLME-SCAN.request.primitive and the information included in the probe response frame 810 by using various methods. The matched probe response frame 810 may be the frame that includes the element that at least one is identical to the element indicated by the scan request information (i.e., the MLME-SCAN.request.primitive) generated by the third STA 850.

In case that the probe response frame 810 is the matched probe response frame, the third STA 850 does not transmit the probe request frame (step, S840).

If the probe response frame 810 that the third STA 850 receives is the matched probe response frame, the third STA 850 may not transmit the probe request frame in the corresponding channel. The third STA 850 may perform the combination process with the AP 870 based on the probe response frame received.

In case that the received probe response frame 810 is not the matched probe response frame, the third STA 850 transmits the probe request frame (step, S860).

If the probe response frame that the third STA 850 receives is the matched probe response frame, the third STA 850 may transmit the probe request frame in the corresponding channel and perform the active scanning procedure. In case that the third STA 850 receives the probe response frame which is the response to the later probe request frame, the third STA 850 may combine with the AP 870 based on the probe response frame.

Figure 9:
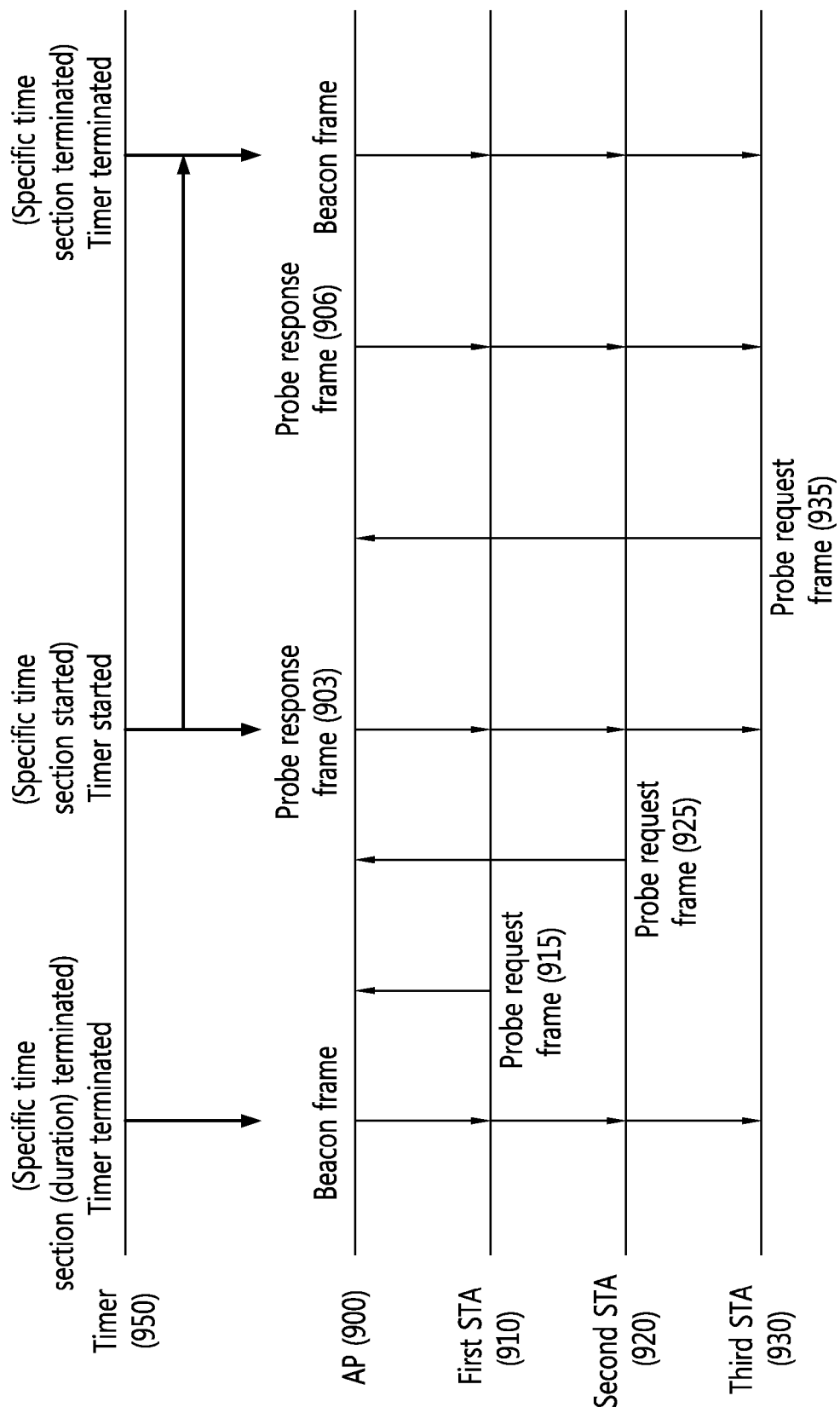
FIG. 9 is a conceptual diagram illustrating the operation of AP according to an embodiment of the present invention.

FIG. 9 is a conceptual diagram illustrating the operation of AP according to an embodiment of the present invention.

In FIG. 9, the case is illustrated that multiple STAs transmit the probe request frame before the timer is started.

After a timer 950 of an AP 900 is terminated, multiple STAs (a first STA 910 and a second STA 920) may transmit the probe request frame (915 and 925) to the AP 900. As described in FIG. 7 above, the AP 900 may operate the timer after unicasting the probe response frame for the first STA 910, and the AP 900 may broadcast the probe response frame for the second STA 920. As another operation method of the AP 900, the case may be assumed that the AP 900 receives the probe request frame from another STA after the timer 950 is terminated and before transmitting the first probe response frame to the STA. In this case, the probe response frame which is firstly transmitted after the timer 950 is terminated may also be broadcasted or multicasted, not unicasted.

For example, the case may be assumed that the procedure of generating the probe response frame is ongoing as a response to the probe request frame 915 of the first STA 910 after the timer 950 of the AP 900 is terminated. The AP 900 may receive the probe request frame 925 from the second STA 920 while the process of generating the probe response frame which will be transmitted to the first STA 910 is ongoing. In such a case, the AP 900 may decide the transmission method for the probe response frame based on the probe request frame 915 transmitted from the first STA 910 and the probe request frame 925 transmitted from the second STA 920.

For example, based on the information element included in the probe request frame 915 transmitted from the first STA 910 and the information element included in the probe request frame 925 transmitted from the second STA 920, whether to broadcast or unicast the probe response frame may be decided. For example, this may be applied to the case that individual request information is not included in the probe request frame 915 and 925 that multiple STAs transmit. In this case, the AP 900 may broadcast the probe response frame 903, not required to unicast the individual probe response frame to each of the STAs 910 and 920. Such a transmission method of the AP 900 is just an example, even in cast that individual request information is included in the probe request frame 915 and 925 transmitted from multiple STAs 910 and 920 according to the determination of the AP 900, if the information to be transmitted to the multiple STAs 910 and 920 is identical, the AP 900 may broadcast the probe response frame 903. Also, in case that the information that the AP 900 is going to transmit to the multiple STAs 910 and 920 is not identical, the AP 900 may also broadcast the probe response frame 903 according to the determination of the AP 900.

The AP 900 unicasts or broadcasts the first probe response frame 903 after the timer 950 is terminated, and then the timer 950 may be started again. As described above, the timer 950 may be terminated at a specific time (i.e., when transmitting the beacon frame).

In FIG. 9, although the first probe request frame is broadcasted, but the probe response frame may be broadcasted in the certain time interval (duration) based on the configuration for the certain time interval instead of the timer.

Figure 10:
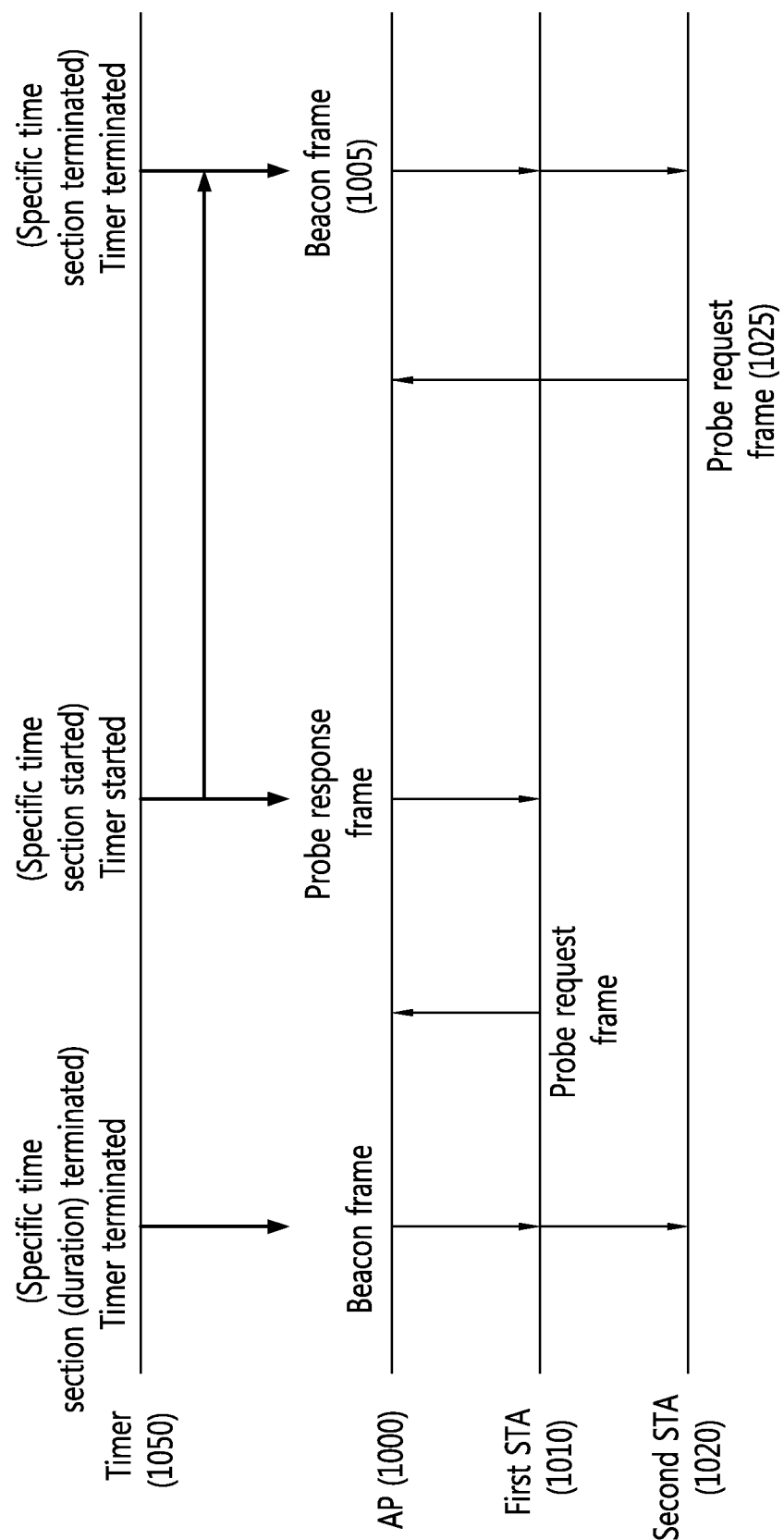
FIG. 10 is a conceptual diagram illustrating the operation of AP according to an embodiment of the present invention.

FIG. 10 is a conceptual diagram illustrating the operation of AP according to an embodiment of the present invention.

Referring to FIG. 10, an AP 1000 may transmit the scanning frame (i.e., the beacon frame, the fast initial link setup (FILS) beacon frame or the measurement pilot) except the probe response frame to the STA before transmitting the probe response frame.

For example, the AP 1000 may receive the probe request frame 1025 before a timer 1050 is terminated. During the process for generating the probe response frame as a response to the probe request frame 1025, the transmission cycle of the scanning frame 1005 except the probe response frame may be returned. In this case, instead of transmitting the probe response frame, the AP 1000 may transmit other scanning frame 1005. In such a case, a STA 1020 may perform the scanning operation based on the other scanning frame 1005 which is transmitted from the AP 1000. Accordingly, the AP 1000 may not transmit the probe response frame to the STA 1020.

That is, in FIG. 10, in case that the AP 1000 is unable to transmit the probe response frame before the timer is terminated even in case of receiving the probe request frame before the timer is terminated, the AP 1000 may not transmit the corresponding probe response frame.

In FIG. 10, the transmission method for the probe response frame may also be decided based on a certain time interval (duration) instead of the timer. Exceptionally, even in case of receiving the probe request frame in the certain time interval, the AP 1000 may not transmit the probe response frame if the timing for transmitting the probe response frame gets out of the certain time interval.

Figure 11:
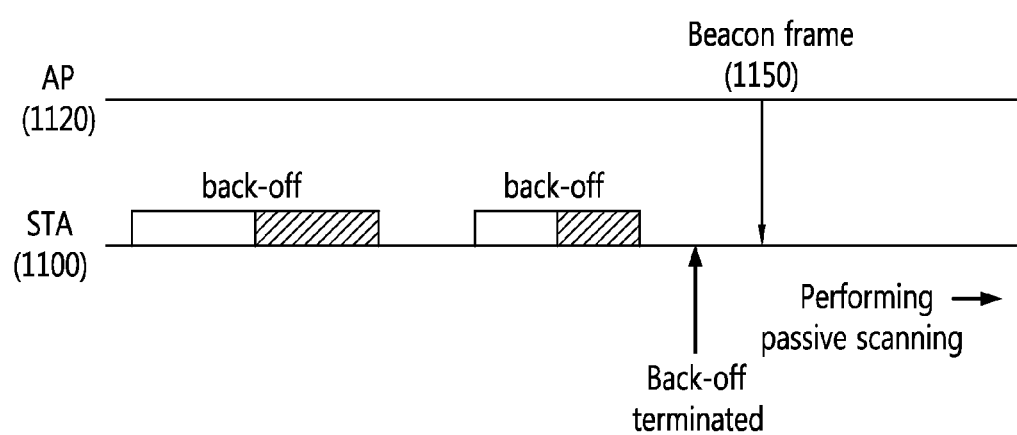
FIG. 11 is a conceptual diagram illustrating the operation of STA according to an embodiment of the present invention.

FIG. 11 is a conceptual diagram illustrating the operation of STA according to an embodiment of the present invention.

In FIG. 11, the case that a STA performs the active scanning procedure is assumed and described.

If the channel is idle, the STA 1100 may easily secure the transmission channel for transmitting the probe response frame. However, if the channel is busy, the STA 1100 may not easily secure the channel for transmitting the probe response frame. In this case, the STA 1100 may secure the channel by performing the back-off procedure. According to the embodiment of the present invention, it will be described that in case that the STA 1100 checks the state of channel and determines that the channel is busy, the STA 1100 stops the active scanning procedure and performs the passive scanning. For example, in order to transmit the probe request frame in the active scanning procedure of the STA 1100, the transmission channel should be secured through the back-off procedure.

If the channel is busy and the transmission channel is not secured, the scanning for the AP 1120 may be performed more quickly by receiving the beacon frame instead of performing the pack-off procedure. According to the embodiment of the present invention, if the channel is busy and the transmission channel is not secured, the STA 1100 may restrict the number of performing the back-off procedure in order to prevent the case of performing the back-off procedure continuously. That is, in case that the STA 1100 performs the back-off procedure for specific times, the STA 1100 may stop the active scanning procedure and perform the passive scanning procedure.

FIG. 11 illustrates the case of stopping the back-off procedure if the STA 1100 is unable to secure the transmission channel even after performing, for example, 2 times of back-off procedures. The STA 1100 may perform the passive scanning procedure by receiving the scanning frame which is transmitted from an AP 1120 by elongating the probe delay. The scanning frame may be, for example, the beacon frame, the measurement pilot, the FILS beacon, or the probe response frame broadcasted.

The back-off procedure based on the distribute coordination function (DCF) may be performed as follows briefly. Generally, when the STA operates under the DCF access environment, if the medium is not used for more than DCF interface space (DIFS) term (the case that the medium is idle), the STA may transmit the probe request frame.

The STA 1100 trying to transmit a frame by the DCF may monitor the state of channel. The back-off time counter decreases the back-off time while the channel is detected to be idle. The back-off time counter may stop when the transmission is detected on channel, and operate again when the idle state greater than the DIFS is detected, thereby the back-off time can be decreased.

When the counter is operated and the back-off time becomes 0, the STA 1100 may transmit the frame. In each transmission, the back-off time may be selected within the range of [0, CW−1] as a time slot unit.

In case that the procedure that the back-off time configured through the procedure above described is performed for more than predetermined times, the STA 1100 may not perform the active scanning procedure any more. That is, the STA 1100 may stop the back-off procedure, and monitor other scanning frame in order to perform the passive scanning. As described above, when it is assumed that the STA 1100 is configured to perform the procedure of decreasing the back-off time up to 2 times, if the STA 1100 is unable to secure the channel for transmitting the probe request frame within 2 times, the STA 1100 may stop the back-off procedure.

The STA 1100 may monitor whether the scanning frame (i.e., the beacon frame, the measurement pilot, the FILS beacon or the probe response frame broadcasted) is received or not.

Figure 12:
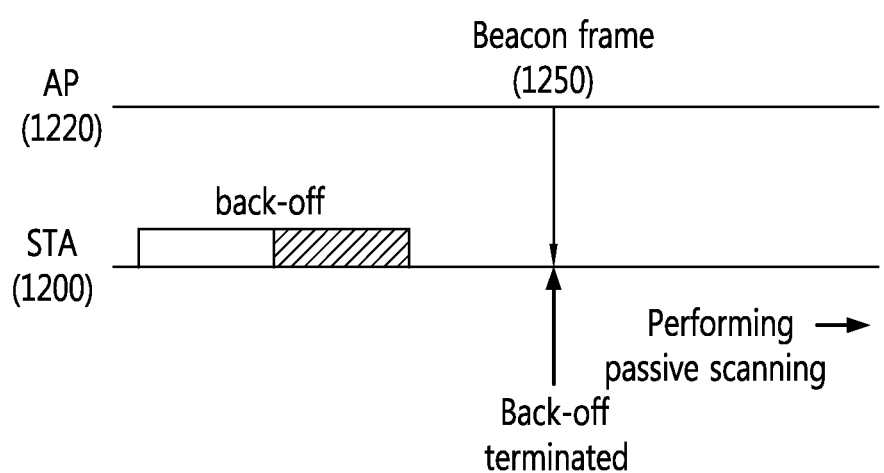
FIG. 12 is a conceptual diagram illustrating the operation of STA according to an embodiment of the present invention.

FIG. 12 is a conceptual diagram illustrating the operation of STA according to an embodiment of the present invention.

FIG. 12 is a conceptual diagram illustrating the case that a STA 1200 receives the scanning frame (i.e., the beacon frame, the measurement pilot, the FILS beacon or the probe response frame broadcasted) during performing the back-off procedure.

Referring to FIG. 12, the STA 1200 may receive the scanning frame (i.e., the beacon frame, the measurement pilot, the FILS beacon or the probe response frame broadcasted) during performing the back-off procedure by 2 times. In case that the STA 1200 may perform the scanning based on the scanning frame received, the STA 1200 may stop the back-off procedure and perform the scanning procedure based on the scanning frame received.

Figure 13:
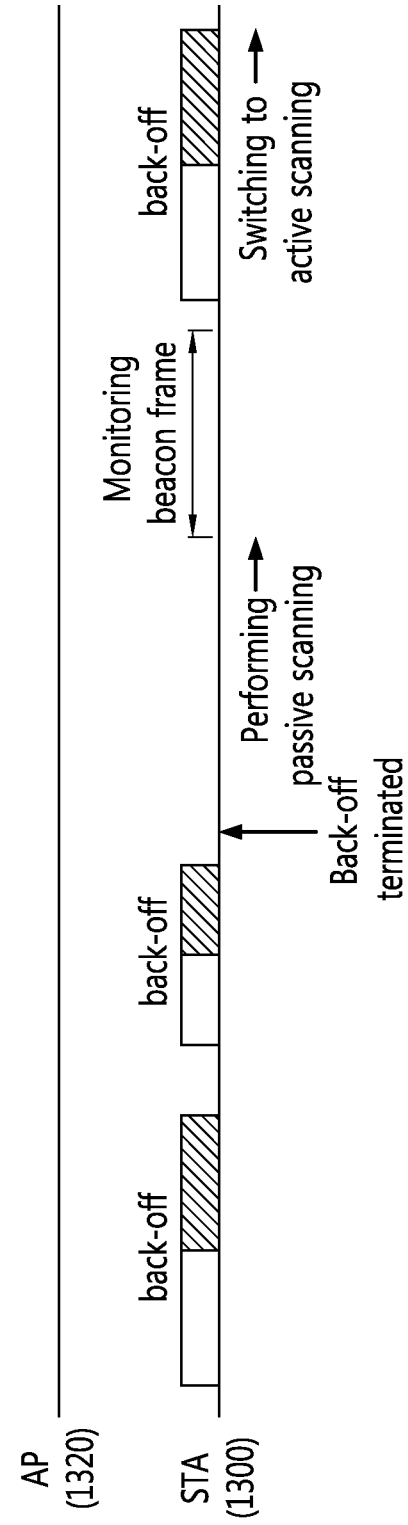
FIG. 13 is a conceptual diagram illustrating the operation of STA according to an embodiment of the present invention.

FIG. 13 is a conceptual diagram illustrating the operation of STA according to an embodiment of the present invention.

Referring to FIG. 13, a STA 1300 that monitors the scanning frame (i.e., the beacon frame) by being switched to the passive scanning procedure may be switched to the active scanning again. For example, even in case of being switched to the passive scanning procedure, the scanning frame may not be transmitted from an AP 1320. In such a case, the STA 1300 may be switched to the active scanning procedure again and operated. For example, the STA 1300 may monitor the beacon frame transmitted from the AP 1320 fur a specific period, such as 400 ms, based on the cycle (for example, 100 ms) that the AP 1320 transmits the beacon frame. In case that the STA 1300 is unable to receive the beacon frame transmitted from the AP 1320 for 400 ms, the STA 1300 may be switched to the active scanning mode again. This is an example of the determination method that the STA 1300 is to be switched to the active scanning, and the STA 1300 may be switched to the active scanning by other standard.

Figure 14:
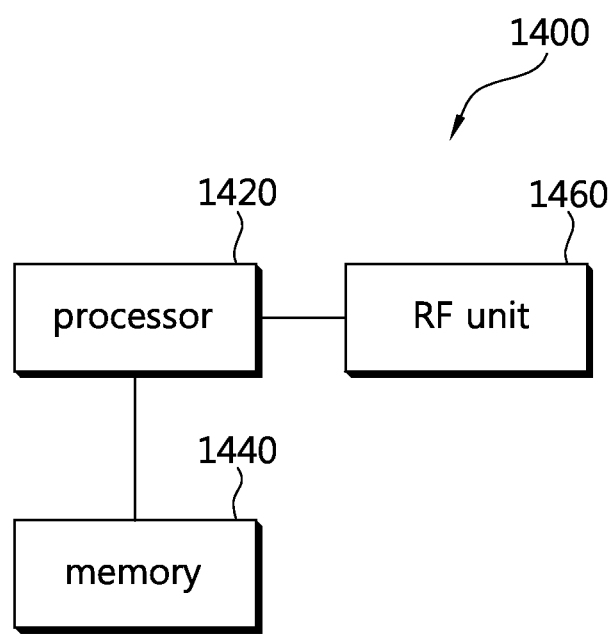
FIG. 14 is a block diagram illustrating the wireless apparatus in which an embodiment of the present invention can be implemented.

FIG. 14 is a block diagram illustrating the wireless apparatus in which an embodiment of the present invention can be implemented.

Referring to FIG. 14, the wireless apparatus is the STA that may implement the embodiments described above, and may also be an AP or non-AP station.

The wireless apparatus 1400 includes a processor 1420, a memory 1440 and a radio frequency (RF) unit 1460.

The RF unit 1460 may be connected to the processor 1420 and transmits/receives the radio signal.

The processor 1420 implements the proposed functions, processes and/or methods. For example, the processor 1420 may be configured to perform the operation of the wireless apparatus according to the embodiments of the present invention described above.

For example, in case that the wireless apparatus is the AP, the processor 1420 may be implemented that the AP receives the first probe request frame for the first STA and the AP unicasts the first probe response frame as a response to the first probe request frame to the first STA. The processor 1420 may be implemented to start a timer after unicasting the first probe response frame, to receive the second probe request frame from a second STA while the timer is operating, and to broadcast the second probe response frame as a response to the second probe request frame.

As another example, in case that the wireless apparatus is the AP, the processor 1420 may be implemented to receive the first probe request frame from the first STA, to unicast the first probe response frame as a response to the first probe request frame to the first STA by the wireless apparatus, to receive the second probe request frame from the second STA for a certain time interval after unicasting the first probe response frame to the first STA, and to broadcast the second probe response frame as a response to the second probe request frame for the certain time interval. The certain time interval may be the time interval which is started when the first probe request frame is transmitted and terminated when the passive scanning frame is transmitted.

In addition, the processor 1420, in case that the wireless apparatus is the STA, may be switched to the active scanning and the passive scanning as the scanning method according to the channel state and whether to transmit the scanning frame such as the beacon frame.

The processor 1420 may include Application-Specific Integrated Circuits (ASICs), other chipsets, logic circuits, data processors and/or convertors that reciprocally convert baseband signals and radio signals. The memory 1440 may include Read-Only Memory (ROM), Random Access Memory (RAM), flash memory, memory cards, storage media and/or other storage devices. The RF unit 1460 may include one or more antennas to transmit and/or receive the radio signal.

When the embodiment is implemented in software, the aforementioned scheme may be implemented as a module (process or function) that performs the aforementioned function. The module may be stored in the memory 1440 and executed by the processor 1420. The memory 1440 may be placed inside or outside the processor 1420 and may be connected to the processor 1420 using a variety of well-known means.

What is claimed is:

1. A method for scanning in a wireless local area network, comprising:
   receiving, by an access point (AP), a first probe request frame from a first station (STA);
   unicasting by the AP, a first probe response frame as a response to the first probe request frame to the first STA;
   receiving a second probe request frame from a second STA during a specific time duration after unicasting the first probe response frame to the first STA; and
   broadcasting a second probe response frame as a response to the second probe request frame during the specific time duration,
   wherein the specific time duration is started when the first probe request frame is transmitted and the specific time duration is terminated when a passive scanning frame is transmitted,
   wherein when the second probe response frame is transmitted to a third STA, the third STA determines whether to transmit a third probe request frame by determining whether the second probe response frame is a matched probe response frame based on the second probe response frame, and
   wherein the matched probe response frame includes at least one element which is identical to an element indicated by scan request information generated by the third STA.

2. The scanning method of claim 1,
   wherein the passive scanning frame is one of a beacon frame, a fast initial link setup (FILS) beacon frame and a measurement pilot frame.

3. The scanning method of claim 1, wherein the scan request information includes at least one of:
   a basic service set identifier (BSSID) element indicating a specific BSSID or a wildcard BSSID,
   a service set identifier (SSID) element indicating a required SSID or a wildcard SSID,
   a probe delay element indicating a delay which is used before transmitting a probe request frame during an active scanning, and
   a request parameter element which is used for determining whether to transmit a probe response frame as a response to the probe request frame by a response station.

4. The scanning method of claim 3, wherein the request parameter element includes:
   a report request field indicating other BSS information which is requested to be included in the probe response frame,
   a delay reference field indicating a delay type which is applied to a response to the probe request frame, and
   a maximum delay limit indicating a maximum access delay in the delay type indicated by the delay reference field.

5. A method for a scanning in a wireless local area network, comprising:
   after receiving a scan request indicating an active scan, determining, by a station (STA), whether an indication primitive, indicating a physical layer of the STA has successfully received a valid physical layer header of a new physical protocol data unit (PPDU), is received at a medium access control (MAC) layer of the STA;
   if the indication primitive is received at the MAC layer, determining whether a probe response received at the STA identifies an access point (AP) which the STA considers a suitable candidate for association; and
   if the probe response identifies the access point (AP), skipping transmission of a probe request to the AP.

6. The method of claim 5, wherein the probe response is broadcast to the STA.

7. The method of claim 5, wherein the probe response is determined to identify the AP if at least one information element of the probe response is matched to at least one information element of the scan request.

8. A wireless station in a wireless local area network, comprising:
   a radio frequency (RF) receiver/transmitter; and
   a processor coupled to the RF receiver/transmitter that:
   determines, after receiving a scan request indicating an active scan, whether an indication primitive, indicating a physical layer of the STA has successfully received a valid physical layer header of a new physical protocol data unit (PPDU), is received at a medium access control (MAC) layer of the STA;
   if the indication primitive is received at the MAC layer, determines whether a probe response received at the STA identifies an access point (AP) which the STA considers a suitable candidate for association; and
   if the probe response identifies the access point (AP), determines to skip transmission of a probe request to the AP.

9. The wireless station of claim 8, wherein the probe response is broadcast to the STA.

10. The wireless station of claim 8, wherein the probe response is determined to identify the AP if at least one information element of the probe response is matched to at least one information element of the scan request.

\* \* \* \* \*